United States Patent
Izhar et al.

(10) Patent No.: US 8,594,335 B1
(45) Date of Patent: Nov. 26, 2013

(54) KEY VERIFICATION SYSTEM AND METHOD

(75) Inventors: Amnon Izhar, Brookline, MA (US); John Carrel, West Roxbury, MA (US)

(73) Assignee: EMC Corporation, Hopkinton, MA (US)

( * ) Notice: Subject to any disclaimer, the term of this patent is extended or adjusted under 35 U.S.C. 154(b) by 1420 days.

(21) Appl. No.: 11/864,054

(22) Filed: Sep. 28, 2007

(51) Int. Cl.
*H04L 29/06* (2006.01)

(52) U.S. Cl.
USPC ............ 380/279; 380/280; 380/277; 713/153

(58) Field of Classification Search
USPC ......................................................... 380/279
See application file for complete search history.

(56) References Cited

U.S. PATENT DOCUMENTS

| | | | |
|---|---|---|---|
| 7,272,727 B2 * | 9/2007 | Mimatsu ........................ | 713/193 |
| 7,362,868 B2 * | 4/2008 | Madoukh et al. ............. | 380/277 |
| 7,769,176 B2 * | 8/2010 | Watson et al. ................. | 380/277 |
| 7,818,587 B2 * | 10/2010 | Drew et al. .................... | 713/193 |
| 2003/0074319 A1 * | 4/2003 | Jaquette .......................... | 705/51 |
| 2004/0143733 A1 * | 7/2004 | Ophir et al. .................... | 713/153 |

OTHER PUBLICATIONS

Freeman, William, and Ethan Miller. "Design for a Decentralized Security System for Networked Attached Storage." IEEE Symposium on Mass Storage Systems, 2000.*

* cited by examiner

*Primary Examiner* — Taghi Arani
*Assistant Examiner* — Narciso Victoria
(74) *Attorney, Agent, or Firm* — Brian J. Colandreo; Mark H. Whittenberger; Holland & Knight LLP (57) ABSTRACT

A method, computer program product, and data storage system for associating an encryption key with each of a plurality of storage objects within a data storage system, thus defining a plurality of encryption keys. Each of the plurality of encryption keys is appended to include a key identifier tag, thus defining a plurality of tagged encryption keys. The key identifier tag included within each tagged encryption key identifies the storage object with which the tagged encryption key is associated.

14 Claims, 3 Drawing Sheets

KEY VERIFICATION SYSTEM AND METHOD

TECHNICAL FIELD

This disclosure relates to data storage systems and, more particularly, to encrypted data storage systems.

BACKGROUND

Centralized data storage systems, such as network attached storage devices, may use a plurality of disk drives and a plurality of I/O modules to increase data throughput and to provide for redundancy in the event of a disk drive failure and/or an I/O module failure. In order to protect the data included within these centralized data storage systems, data encryption methodologies may be utilized. For example, one or more data encryption keys may be used to encrypt and decrypt various data portions stored within the centralized data storage system.

Unfortunately, the use of multiple encryption keys may allow for the use of an incorrect encryption key. For example, encryption key "A" may be incorrectly used to encrypt data that should have been encrypted using encryption key "B". Unfortunately, at sometime in the future when the system attempts to decrypt the data using encryption key "B", the decryption step may fail due to the use of the incorrect encryption key. Depending on the strength of the encryption, this may result in the data being unrecoverable.

SUMMARY OF DISCLOSURE

In a first implementation, a method includes associating an encryption key with each of a plurality of storage objects within a data storage system, thus defining a plurality of encryption keys. Each of the plurality of encryption keys is appended to include a key identifier tag, thus defining a plurality of tagged encryption keys. The key identifier tag included within each tagged encryption key identifies the storage object with which the tagged encryption key is associated.

One or more of the following features may be included. Each of the tagged encryption keys may be encrypted to define a plurality of encrypted tagged encryption keys.

Data to be stored within the data storage system may be received. A destination storage object for storing the received data may be identified. The destination storage object may be chosen from the plurality of storage objects.

The tagged encryption key associated with the destination storage object may be obtained. The key identifier tag included within the obtained tagged encryption key may be confirmed to identify the destination storage object. The received data may be encrypted using the obtained tagged encryption key. The received data may be stored within the destination storage object.

A request for data previously stored within the data storage system may be received. A source storage object in which the requested data is stored may be identified. The source storage object may be chosen from the plurality of storage objects.

The tagged encryption key associated with the source storage object may be obtained. The requested data may be obtained from the source storage object. The key identifier tag included within the obtained tagged encryption key may be confirmed to identify the source storage object. The requested data may be decrypted using the obtained tagged encryption key.

At least one of the storage objects may define a portion of a hard disk drive.

In another implementation, a computer program product resides on a computer readable medium that has a plurality of instructions stored on it. When executed by a processor, the instructions cause the processor to perform operations including associating an encryption key with each of a plurality of storage objects within a data storage system, thus defining a plurality of encryption keys. Each of the plurality of encryption keys is appended to include a key identifier tag, thus defining a plurality of tagged encryption keys. The key identifier tag included within each tagged encryption key identifies the storage object with which the tagged encryption key is associated.

One or more of the following features may be included. Each of the tagged encryption keys may be encrypted to define a plurality of encrypted tagged encryption keys.

Data to be stored within the data storage system may be received. A destination storage object for storing the received data may be identified. The destination storage object may be chosen from the plurality of storage objects.

The tagged encryption key associated with the destination storage object may be obtained. The key identifier tag included within the obtained tagged encryption key may be confirmed to identify the destination storage object. The received data may be encrypted using the obtained tagged encryption key. The received data may be stored within the destination storage object.

A request for data previously stored within the data storage system may be received. A source storage object in which the requested data is stored may be identified. The source storage object may be chosen from the plurality of storage objects.

The tagged encryption key associated with the source storage object may be obtained. The requested data may be obtained from the source storage object. The key identifier tag included within the obtained tagged encryption key may be confirmed to identify the source storage object. The requested data may be decrypted using the obtained tagged encryption key.

At least one of the storage objects may define a portion of a hard disk drive.

In another implementation, a data storage system is configured to perform operations comprising associating an encryption key with each of a plurality of storage objects within a data storage system, thus defining a plurality of encryption keys. Each of the plurality of encryption keys is appended to include a key identifier tag, thus defining a plurality of tagged encryption keys. The key identifier tag included within each tagged encryption key identifies the storage object with which the tagged encryption key is associated.

One or more of the following features may be included. Each of the tagged encryption keys may be encrypted to define a plurality of encrypted tagged encryption keys.

Data to be stored within the data storage system may be received. A destination storage object for storing the received data may be identified. The destination storage object may be chosen from the plurality of storage objects.

The tagged encryption key associated with the destination storage object may be obtained. The key identifier tag included within the obtained tagged encryption key may be confirmed to identify the destination storage object. The received data may be encrypted using the obtained tagged encryption key. The received data may be stored within the destination storage object.

A request for data previously stored within the data storage system may be received. A source storage object in which the requested data is stored may be identified. The source storage object may be chosen from the plurality of storage objects.

The tagged encryption key associated with the source storage object may be obtained. The requested data may be obtained from the source storage object. The key identifier tag included within the obtained tagged encryption key may be confirmed to identify the source storage object. The requested data may be decrypted using the obtained tagged encryption key.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
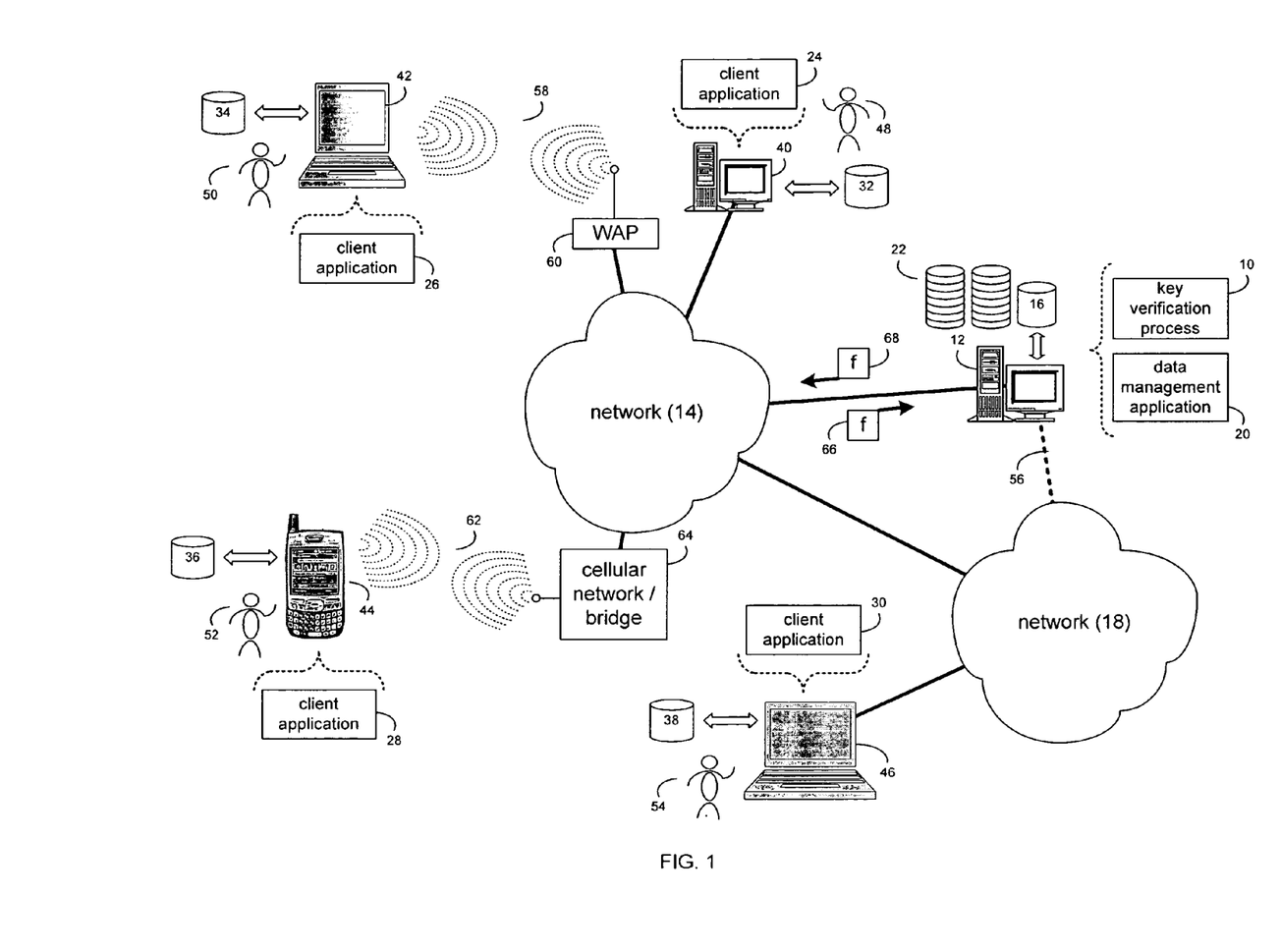
FIG. 1 is a diagrammatic view of a computing device including a data storage system executing a key verification process.

Referring to FIG. 1, there is shown key verification process 10 that may reside on and may be executed by data storage system 12, which may be connected to network 14 (e.g., the Internet or a local area network). Examples of data storage system 12 may include, but are not limited to: a personal computer, a server computer, a series of server computers, a mini computer, and a mainframe computer. Data storage system 12 may be a web server (or a series of servers) running a network operating system, examples of which may include but are not limited to: Microsoft Windows XP Server™; Novell Netware™; or Redhat Linux™, for example.

As will be discussed below in greater detail, key verification process 10 may associate an encryption key with each of a plurality of storage objects within e.g., data storage system 12. Each of the encryption keys may be appended to include a key identifier tag, wherein the key identifier tag included identifies the storage object with which the tagged encryption key is associated.

The instruction sets and subroutines of key verification process 10, which may be stored on storage device 16 coupled to data storage system 12, may be executed by one or more processors (not shown) and one or more memory architectures (not shown) incorporated into data storage system 12. Storage device 16 may include but is not limited to: a hard disk drive; a tape drive; an optical drive; a RAID array; a random access memory (RAM); and a read-only memory (ROM).

Data storage system 12 may execute a web server application, examples of which may include but are not limited to: Microsoft IIS™, Novell Webserver™, or Apache Webserver™, that allows for HTTP (i.e., HyperText Transfer Protocol) access to data storage system 12 via network 14. Network 14 may be connected to one or more secondary networks (e.g., network 18), examples of which may include but are not limited to: a local area network; a wide area network; or an intranet, for example.

Data storage system 12 may execute data management application 20 that may allow for distributed access to data stored within drive system 22. Examples of drive system 22 may include one or more RAID arrays. Key verification process 10 may be a stand alone application that interfaces with data management application 20 or an applet/application that is executed within data management application 20.

The instruction sets and subroutines of data management application 20, which may be stored on storage device 16 coupled to data storage system 12 may be executed by one or more processors (not shown) and one or more memory architectures (not shown) incorporated into data storage system 12.

The instruction sets and subroutines of client applications 24, 26, 28, 30 which may be stored on storage devices 32, 34, 36, 38 (respectively) coupled to client electronic devices 40, 42, 44, 46 (respectively), may be executed by one or more processors (not shown) and one or more memory architectures (not shown) incorporated into client electronic devices 40, 42, 44, 46 (respectively). Examples of client applications 24, 26, 28, 30 may include but are not limited to a database application, a word processing application, a spreadsheet application, a graphics application, a design application, and a file viewer application.

Storage devices 32, 34, 36, 38 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of computing devices 40, 42, 44, 46 may include, but are not limited to, personal computer 40, laptop computer 42, personal digital assistant 44, notebook computer 46, a data-enabled, cellular telephone (not shown), and a dedicated network device (not shown), for example. Using client applications 24, 26, 28, 30, users 48, 50, 52, 54 (respectively) may access data management application 20 and the data stored within drive system 22.

Users 48, 50, 52, 54 may access data management application 20 directly through the device on which the client application (e.g., client applications 24, 26, 28, 30) is being executed, namely client electronic devices 40, 42, 44, 46, for example. Users 48, 50, 52, 54 may access data management application 20 directly through network 14 or through secondary network 18. Further, data storage system 12 (i.e., the system that executes key verification process 10 and data management application 20) may be connected to network 14 through secondary network 18, as illustrated with phantom link line 56.

The various client electronic devices may be directly or indirectly coupled to network 14 (or network 18). For example, personal computer 40 is shown directly coupled to network 14 via a hardwired network connection. Further, notebook computer 46 is shown directly coupled to network 18 via a hardwired network connection. Laptop computer 42 is shown wirelessly coupled to network 14 via wireless communication channel 58 established between laptop computer 42 and wireless access point (i.e., WAP) 60, which is shown directly coupled to network 14. WAP 60 may be, for example, an IEEE 802.11a, 802.11b, 802.11g, Wi-Fi, and/or Bluetooth device that is capable of establishing wireless communication channel 58 between laptop computer 42 and WAP 60. Personal digital assistant 44 is shown wirelessly coupled to network 14 via wireless communication channel 62 established between personal digital assistant 44 and cellular network/bridge 64, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 40, 42, 44, 46 may each execute an operating system, examples of which may include but are not limited to Microsoft Windows™, Microsoft Windows CE™, Redhat Linux™, or a custom operating system.

Key Verification Process

As discussed above, examples of client applications 24, 26, 28, 30 may include but are not limited to a database application, a word processing application, a spreadsheet application, a graphics application, a design application, and a file viewer application. Users 48, 50, 52, 54 may use client applications 24, 26, 28, 30 to access data stored on drive system 22. During use of client applications 24, 26, 28, 30, one or more data files (e.g., data files 66) may be written to drive system 22 and/or one or more data files (e.g., data files 68) may be retrieved from drive system 22.

In order to provide security concerning the data stored on drive system 22, data files received from the various client electronic devices may be encrypted prior to being written to drive system 22. For example, data files 66 may be encrypted prior to being written to drive system 22. Further, data files retrieved from drive system 22 may be decrypted prior to being provided to the various client electronic devices. For example, data files 68 may be decrypted prior to being provided to e.g. personal computer 40.

Figure 2:
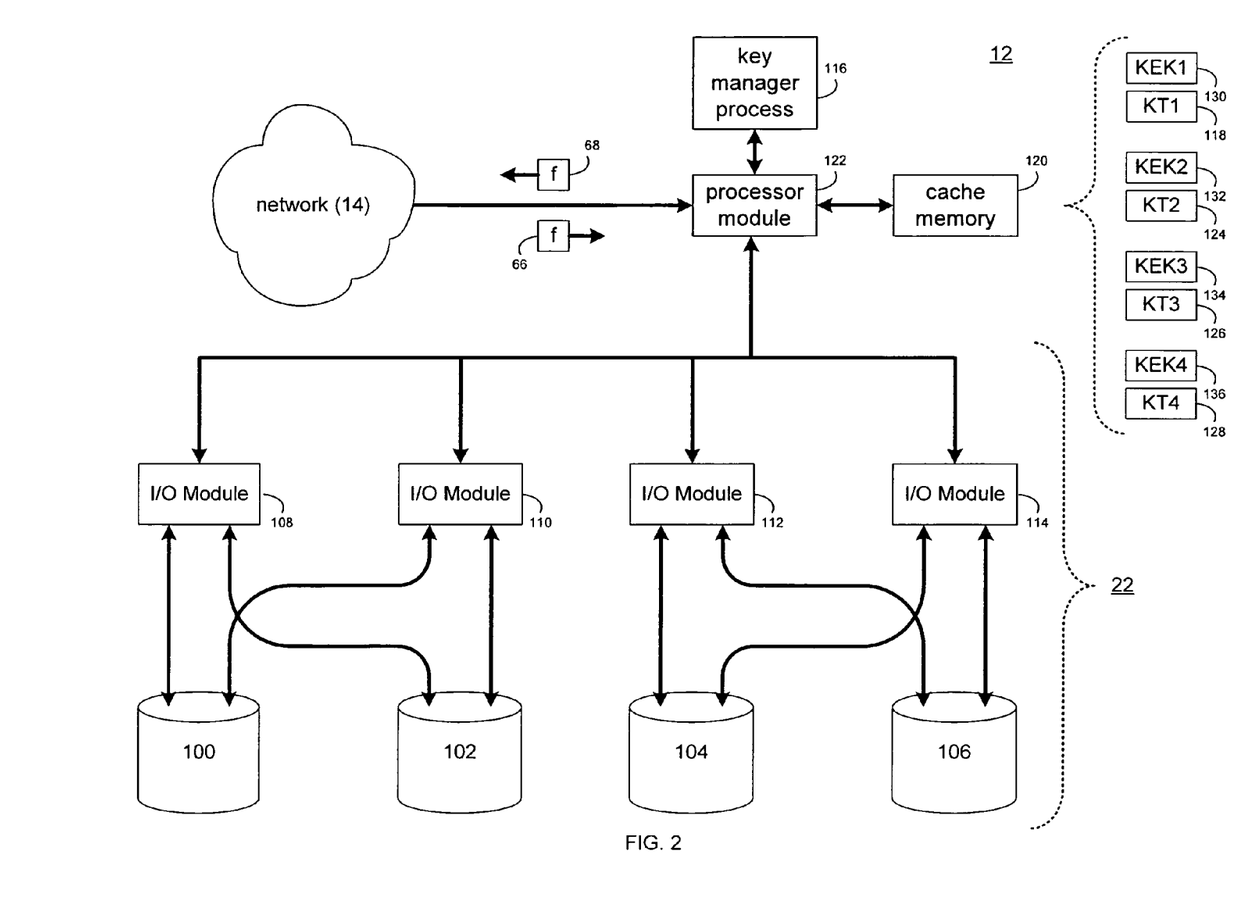
FIG. 2 is a detailed view of the data storage system of FIG. 1.

Referring also to FIG. 2 and for illustrative purposes, drive system 22 is shown to include four discrete drives, namely disk drive 100, disk drive 102, disk drive 104, and disk drive 106. Additionally, drive system 22 is shown to include four I/O modules, namely I/O module 108, I/O module 110, I/O module 112, and I/O module 114.

In this particular exemplary embodiment, I/O module 108 is shown to be coupled to disk drives 100, 102; I/O module 110 is shown to be coupled to disk drives 100, 102; I/O module 112 is shown to be coupled to disk drives 104, 106; and I/O module 114 is shown to be coupled to disk drives 104, 106.

In this particular example, multiple I/O modules (e.g. I/O modules 108, 110) are shown to be coupled to each disk drive (e.g. disk drive 100), and multiple disk drives (e.g. disk drives 100, 102) are shown to be coupled to each I/O module (I/O module 108). By configuring parallel paths within drive system 102, throughput may be increased and/or fault tolerance may be achieved.

For example, through the use of two I/O modules (e.g. I/O modules 108, 110) and two disk drives (e.g. disk drives 100, 102), throughput may be increased by striping data across multiple disk drives (e.g. such as in a RAID 0 array). Additionally, the use of two I/O modules (e.g. I/O modules 108, 110) and two disk drives (e.g. disk drives 100, 102) may allow data to be mirrored across multiple drives to enhance fault tolerance (e.g. such as in a RAID 1 array). Additionally/alternatively, the various drives included within drive system 22 may be configured in accordance with other RAID specifications, such as RAID 3, RAID 5, RAID 10, and RAID 0+1.

When encrypting data files, various methodologies may be utilized. For example, a single encryption key may be utilized to encrypt all data on all drives included within drive system 22. For example, a single encryption key may be utilized to encrypt all of the data stored on disk drives 100, 102, 104, 106. Alternatively and for illustrative purposes, a unique encryption key may be utilized for each of the four disk drives. Further and alternatively, a unique decryption key may be utilized to encrypt data within a certain portion of a disk drive. For illustrative purposes, assume that disk drives 100, 102, 104, 106 each include ten platters, each of which includes two readable/writable surfaces (thus defining eighty storage objects). Accordingly, a unique encryption key may be utilized for each of these eighty storage objects, thus requiring eighty unique encryption keys to access all of the data stored within drive system 22.

Figure 3:
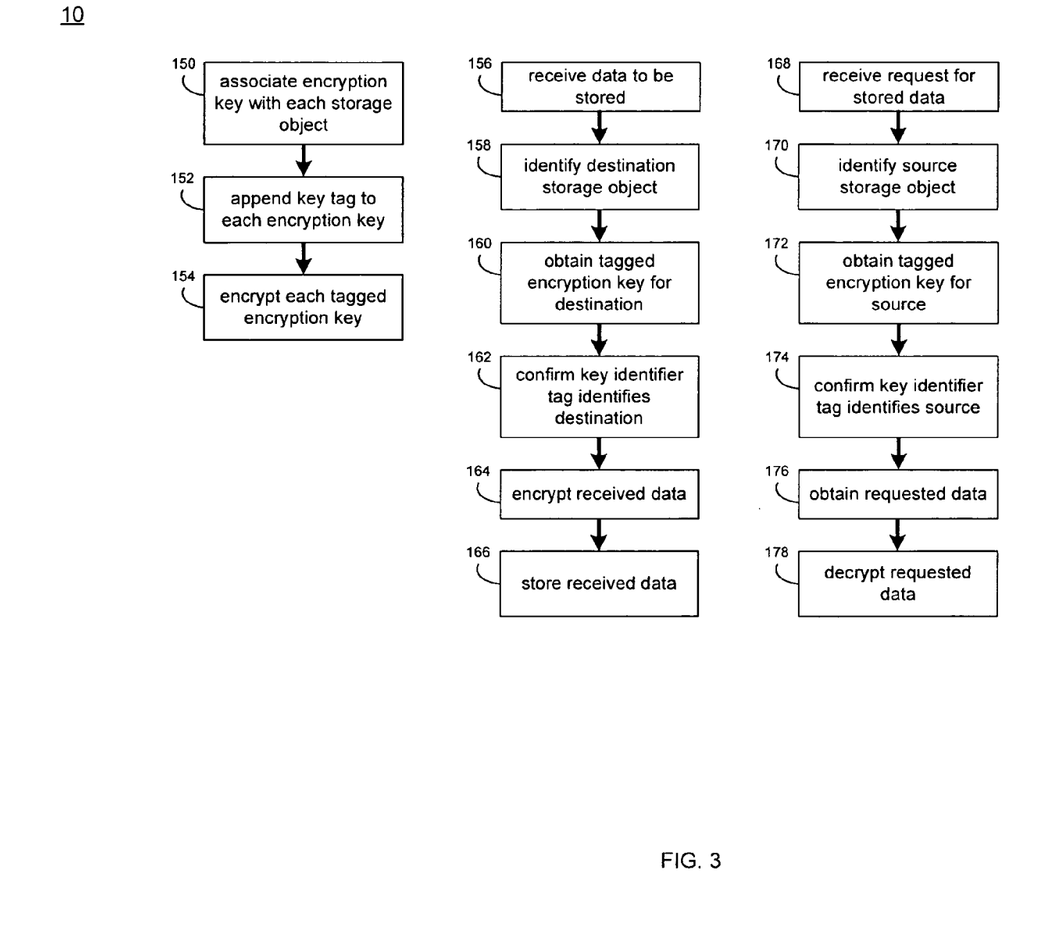
FIG. 3 is a flowchart of a process executed by the data storage system of FIG. 1.

Referring also to FIG. 3 and as discussed above, key verification process 10 may associate 150 an encryption key with each of a plurality of storage objects within e.g., data storage system 12. Each of the associated encryption keys may be appended 152 to include a key identifier tag, wherein the key identifier tag identifies the storage object with which the tagged encryption key is associated.

Specifically, the number of encryption keys required may be decided by the required level of encryption granularity (i.e., the number of storage objects) of data storage system 12. As discussed above, a single encryption key may be used for all disk drives within drive system 22. Alternatively, a single encryption key may be used for each surface of each of the ten platters included within a single disk drive.

An administrator (not shown) of data storage system 12 may define the level of encryption granularity utilized within data storage system 12. Continuing with the above stated example in which drive system 22 includes four discrete disk drives (i.e., disk drive 100, disk drive 102, disk drive 104, disk drive 106), assume for illustrative purposes that the administrator (not shown) decides to divide each of the four disk drives into one-hundred storage objects, for a total of four-hundred storage objects (i.e. for all four disk drives of drive system 22).

The size/number of the individual storage objects into which the disk drives of drive system 22 are divided may vary depending upon e.g., application/performance requirements/design criteria. For example, the individual disk drives may be divided into storage objects based upon disk sectors, disk platters, disk tracks, and disk clusters. While this list is intended to be illustrative, it is not intended to be all-inclusive. Accordingly, other division criteria are considered to be within the scope of this disclosure.

Continuing with the above-stated example in which each of the four disk drives within drive system 22 is divided into one-hundred storage objects, the administrator (not shown) may utilize key manager process 116 to generate one-hundred unique encryption keys for each of the four disk drives. Accordingly and as discussed above, key verification process 10 may associate 150 one of the one-hundred encryption keys (for a particular disk drive) with each of the one-hundred storage objects into which that particular disk drive was divided.

Each of the unique encryption keys generated maybe a symmetric encryption key. Accordingly, the same encryption key may be used to encrypt data prior to writing it to drive system 22 and decrypt data retrieved from drive system 22.

An example of the manner in which key verification process 10 associates 150 the one-hundred encryption keys of a particular drive (e.g., disk drive 100) with the one-hundred storage objects into which that disk drive was divided is as follows:

| Disk Drive 100 | |
|---|---|
| Encryption Key | Associated Storage Object |
| Key 001 | Object 001 |
| Key 002 | Object 002 |

| Disk Drive 100 | |
| --- | --- |
| Encryption Key | Associated Storage Object |
| Key 003 | Object 003 |
| Key 004 | Object 004 |
| . | |
| . | |
| . | |
| Key 097 | Object 097 |
| Key 098 | Object 098 |
| Key 099 | Object 099 |
| Key 100 | Object 100 |

While the following discussion concerns the one-hundred storage objects into which disk drive 100 is divided and the one-hundred encryption keys associated with each of the one-hundred storage objects of disk drive 100, this is for illustrative purposes only and is not intended to be a limitation of this disclosure, as the following discussion may apply to any of the disk drives included within drive system 22.

Once the one-hundred unique encryption keys are generated for disk drive 100, key verification process 10 may append 152 a key identifier tag to each of the one-hundred encryption keys, resulting in the generation of one-hundred tagged encryption keys. The key identifier tag included within each of the one-hundred tagged encryption keys may be a plain text tag and may identify the storage object within disk drive 100 with which the tagged encryption key is associated. For example, key verification process 10 may append each of the one-hundred unique encryption keys as follows:

| Disk Drive 100 | |
| --- | --- |
| Encryption Key | Associated Storage Object |
| (TAG001) Key 001 | Object 001 |
| (TAG002) Key 002 | Object 002 |
| (TAG003) Key 003 | Object 003 |
| (TAG004) Key 004 | Object 004 |
| . | |
| . | |
| . | |
| (TAG097) Key 097 | Object 097 |
| (TAG098) Key 098 | Object 098 |
| (TAG099) Key 099 | Object 099 |
| (TAG100) Key 100 | Object 100 |

An example of an encryption key may be a 512 bit number and an example of a key identifier tag may be a 128 bit number that e.g. defines the specific storage object with which the encryption key is associated. Alternate/additional information may also be included within the key identifier tag. Accordingly, when appending 152 each of the one-hundred encryption keys to include a key identifier tag, the 512 bit encryption key may be appended to include the 128 bit key identifier tag at the beginning of the 512 bit encryption key. Therefore, when processing the tagged encryption keys (which are 640 bits long), the first 128 bits of the tagged encryption key may be removed and processed as the key identifier tag. Accordingly, the tagged encryption key for storage object 001 of disk drive 100 may appear as follows:

| Object 001 of Disk Drive 100 | |
| --- | --- |
| 128 bit tag | 512 bit encryption key |

Key verification process 10 may encrypt 154 each of the one-hundred tagged encryption keys to define a plurality of encrypted tagged encryption keys. Specifically, when configuring data storage process 12, key verification process 10 may generate (via key manager process 116) a public/private Key Encryption Key (KEK) pair, which may be used to encrypt each of the above-described tagged encryption keys.

For example, once the above-described one-hundred tagged encryption keys are generated, key verification process 10 may encrypt 154 (via e.g., key manager process 116) each of the one-hundred tagged encryption keys using the above-described public key of the KEK pair. As is known in the art, once a public key is used to encrypt a piece of data, the encrypted piece of data may only be decrypted using the associated private key. Accordingly, when a tagged encryption key is encrypted using the public key of the KEK pair, the encrypted tagged encryption key can only be decrypted using the private key of the KEK pair.

Once each of the tagged encryption keys are encrypted 154 using the above-described public key of the KEK pair, key verification process 10 may store the group of one-hundred encrypted tagged encryption keys as a key table (e.g., key table 118) within cache memory 120 of processor module 122. Cache memory 120 may be incorporated within the individual microprocessors of processor module 122 or may be external to the individual microprocessors of processor module 122. Processor module 122 may be a multi-processor module that may include a plurality of microprocessors (e.g., Intel Xenon™ microprocessors available from the Intel Corporation of Santa Clara, Calif.).

Key verification process 10 may generate and store (within cache memory 120) a unique key table for each of the I/O modules. For example, key verification process 10 may generate key table 118 for I/O module 108; key verification process 10 may generate key table 124 for I/O module 110; key verification process 10 may generate key table 126 for I/O module 112; and key verification process 10 may generate key table 128 for I/O module 114.

As discussed above, key verification process 10 may generate (via key manager process 116) a public/private Key Encryption Key (KEK) pair for encrypting 154 each of the above-described tagged encryption keys that are included within key table 118. For security purposes, a unique KEK pair may be generated by key verification process 10 for each of the key tables (e.g., key tables 118, 124, 126, 128) utilized by each of I/O modules 108, 110, 112, 114 (respectively). Accordingly, key verification process 10 may store: private KEK 130 (for key table 118/I/O module 108); private KEK 132 (for key table 124/I/O module 110); private KEK 134 (for key table 126/I/O module 112); and private KEK 136 (for key table 128/I/O module 114), within cache memory 120.

As will be discussed below in greater detail, upon receiving data to be stored within a storage object of a disk drive (e.g., disk drive 100), the I/O module assigned to the disk drive may obtain the appropriate private KEK (e.g., private KEK 130) from cache memory 120 so that the associated tagged encryption key may be decrypted (e.g., using private KEK 130), thus allowing the received data to be encrypted (e.g., using the decrypted tagged encryption key) prior to writing the received data to e.g., disk drive 100.

Assume for illustrative purposes that data files 66 are received 156 (via e.g. network 14) by processor module 122 for storage within data storage system 12. Key verification process 10 may identify 158 a destination storage object for storing received data files 66. Specifically, processor module 122 of data storage system 12 may be configured to identify 158 a particular storage object within a particular disk drive (e.g., of drive system 22) for storing data file 66. Accordingly, assume for illustrative purposes that processor module 122 selects "Storage Object 004" of disk drive 100 for storing data files 66.

Upon identifying 158 "Storage Object 004" of disk drive 100 as the destination storage object of data files 66, processor module 122 may provide data files 66 to I/O module 108 for storage within "Storage Object 004" of disk drive 100. As discussed above, drive system 22 may utilize multiple I/O modules for each disk drive. For illustrative purposes, disk drive 100 is shown to be coupled to I/O modules 108, 110. Accordingly, while in this example, data files 66 are described as being provided to I/O module 108, this assumes that I/O module 108 is functioning (i.e., has not failed). In the event of a failure of I/O module 108, control of disk drive 100 may be assumed by I/O module 110. Accordingly, in the event of such a failure, data files 66 may be provided to I/O module 110.

In addition to providing data files 66 to I/O module 108, processor module 122 may also provide to I/O module 108 designation instructions concerning where to store data files 66 (namely "Storage Object 004" of disk drive 100). Upon receiving data files 66 and the above-described designation instructions, key verification process 10 may obtain 160 the tagged encryption key associated with the destination storage object (e.g., "Storage Object 004" of disk drive 100). Specifically, I/O module 108 of drive system 22 may obtain the appropriate encryption key so that data file 66 may be encrypted prior to being stored within "Storage Object 004" of disk drive 100.

When obtaining 160 the appropriate tagged encryption key, I/O module 108 may request from processor module 122 the appropriate encrypted tagged encryption key stored within cache memory 120. Specifically, I/O module 108 may request the appropriate encrypted tagged encryption key from key table 118 stored within cache memory 120. As shown in the above-illustrated representation of key table 118, the appropriate encrypted tagged encryption key may appear as follows:

| Object 004 of Disk Drive 100 | |
|---|---|
| Key 004 (TAG004) | Object 004 |

As illustrated above, the appropriate encrypted tagged encryption key for "Storage Object 004" of disk drive 100 is shown to include tag "TAG004". Upon receiving this encrypted tagged encryption key for "Storage Object 004" of disk drive 100 from processor module 122, I/O module 108 may decrypt the encrypted tagged encryption key (using private KEK 130 stored within cache memory 120) to generate the appropriate tagged encryption key. Being that the tagged encryption key includes a key identifier tag (e.g. TAG004), once the encrypted tagged encryption key is decrypted, key verification process 10 may confirm 162 that the key identifier tag (e.g. TAG004) included within the obtained tagged encryption key identifies the destination storage object (e.g., "Storage Object 004" of disk drive 100).

Specifically, I/O module 108 may compare the key identifier tag (e.g. TAG004) actually included within the tagged encryption key with the key identifier tag that is expected to be within the tagged encryption key. In order to determine what key identifier tag is expected to be within the tagged encryption key, I/O module 108 may e.g. examine key table 118 stored within cache memory 120 of processor module 122. Upon examining key table 118, I/O module 108 will determine that the key identifier tag expected to be within the decrypted tagged encryption key is TAG004. Upon performing the above-described comparison, I/O module 108 may confirm 162 that the expected key identifier tag and the actual key identifier tag match.

Accordingly, by confirming 162 that the actual and expected key identifier tags match, I/O module 108 is also confirming that processor module 122 provided I/O module 108 with the appropriate tagged encryption key. Specifically and for example, assume that when I/O module 108 obtained 160 the tagged encryption key for "Storage Object 004" of disk drive 100, processor module 122 incorrectly provided I/O module 108 with the tagged encryption key for "Storage Object 003" of disk drive 100. Upon I/O module 108 decrypting the encrypted tagged encryption key for "Storage Object 003" of disk drive 100 (using private KEK 130 stored within cache memory 120), the tagged encryption key generated would include the key identifier tag TAG003 (as shown in the above-illustrated representation of key table 118). Accordingly, when I/O module 108 compares the key identifier tag (e.g. TAG003) actually included within the tagged encryption key with the key identifier tag (e.g. TAG004) expected to be included within the tagged encryption key, the comparison would fail. Therefore, key verification process 10 could not confirm 162 that the key identifier tag (e.g. TAG003) included within the obtained tagged encryption key identifies the destination storage object (e.g., "Storage Object 004" of disk drive 100), thus indicating that e.g., the tagged encryption key provided by processor module 122 to I/O module 108 was e.g. corrupt or incorrect.

Moving forward on the assumption that key verification process 10 confirmed 162 that the key identifier tag (e.g. TAG004) included within the obtained tagged encryption key properly identifies the destination storage object (e.g., "Storage Object 004" of disk drive 100), key verification process 10 may encrypt 164 data files 66 using the obtained tagged encryption key, thus generating encrypted data that is stored 166 within the destination storage object (e.g., "Storage Object 004" of disk drive 100).

Once data is stored within data storage system 12, the stored data may be subsequently retrieved for later use by e.g., client applications 24, 26, 28, 30. Accordingly, client applications 24, 26, 28, 30 may request data (e.g. data files 68) previously stored within data storage system 12. Accordingly, key verification process 10 may receive 168 a request for data previously stored within data storage system 12 from one or more of client applications 24, 26, 28, 30. Upon receiving 168 such a request, key verification process 10 may identify 170 the source storage object in which the requested data (e.g. data files 68) is stored.

Specifically, processor module 122 of data storage system 12 may be configured to identify 170 a particular storage object within a particular disk drive (e.g., of drive system 22) within which the requested files (e.g., data files 68) were previously stored. As discussed above, processor module 122 of data storage system 12 may be configured to identify 158 a particular storage object within a particular disk drive for storing various data files. Accordingly, processor module 122 knows the location of the various data files stored within the various storage objects of data storage device 12. Accordingly, as data files 68 were previously stored by processor module 122, processor module 122 knows the location of data files 68 when processor module 122 receives the above-described request.

Assume for illustrative purposes that processor module 122 identifies 170 the source storage object as "Storage Object 098" of disk drive 100 (i.e., the storage object in which data files 68 were previously stored).

Upon processor module 122 identifying 170 the source storage object as "Storage Object 098" of disk drive 100, key verification process 10 may obtain 172 the tagged encryption key associated with the source storage object (e.g., "Storage Object 098" of disk drive 100). Specifically, I/O module 108 of drive system 22 may obtain the appropriate encryption key so that data file 68 may be decrypted prior to being provide to the requestor of data file 68.

When obtaining 172 the appropriate tagged encryption key, I/O module 108 may request from processor module 122 the appropriate encrypted tagged encryption key stored within cache memory 120. Specifically, I/O module 108 may request the appropriate encrypted tagged encryption key from key table 118 stored within cache memory 120. As shown in the above-illustrated representation of key table 118, the appropriate encrypted tagged encryption key may appear as follows:

| Object 098 of Disk Drive 100 | |
|---|---|
| Key 098 (TAG098) | Object 098 |

As illustrated above, the appropriate encrypted tagged encryption key for "Storage Object 098" of disk drive 100 is shown to include tag "TAG098". Upon receiving this encrypted tagged encryption key for "Storage Object 098" of disk drive 100 from processor module 122, I/O module 108 may decrypt the encrypted tagged encryption key (using private KEK 130 stored within cache memory 120) to generate the appropriate tagged encryption key. Being that the tagged encryption key includes a key identifier tag (e.g. TAG098), once the encrypted tagged encryption key is decrypted, key verification process 10 may confirm 174 that the key identifier tag (e.g. TAG098) included within the obtained tagged encryption key properly identifies the source storage object (e.g., "Storage Object 098" of disk drive 100).

Specifically, I/O module 108 may compare the key identifier tag (e.g. TAG098) actually included within the tagged encryption key with the key identifier tag that is expected to be within the tagged encryption key. As discussed above, in order to determine what key identifier tag is expected to be within the tagged encryption key, I/O module 108 may e.g. examine key table 118 stored within cache memory 120 of processor module 122. Upon examining key table 118, I/O module 108 may determine that the key identifier tag expected to be within the decrypted tagged encryption key is TAG098. Upon performing the above-described comparison, I/O module 108 may confirm 174 that the expected key identifier tag and the actual key identifier tag match.

Again and as discussed above, by confirming 174 that the actual and expected key identifier tags match, I/O module 108 is also confirming that processor module 122 provided I/O module 108 with the appropriate tagged encryption key. Accordingly and for the reasons discussed above, if processor module 122 had incorrectly provided I/O module 108 with the tagged encryption key for "Storage Object 099" of disk drive 100, the above described comparison (of actual and anticipated key tag identifiers) would fail, thus indicating that e.g., the tagged encryption key provided by processor module 122 to I/O module 108 was e.g. corrupt or incorrect.

Moving forward on the assumption that key verification process 10 confirmed 174 that the key identifier tag (e.g. TAG098) included within the obtained tagged encryption key properly identifies the source storage object (e.g., "Storage Object 098" of disk drive 100), key verification process 10 may obtain 176 the requested data files (e.g., data files 68) from e.g., "Storage Object 098" of disk drive 100) and may decrypt 178 the requested data files prior to providing the requested data files to the requestor A number of implementations have been described. Nevertheless, it will be understood that various modifications may be made. Accordingly, other implementations are within the scope of the following claims.

What is claimed is:

1. A method comprising:
    associating an encryption key with each of a plurality of storage objects within a data storage system, thus defining a plurality of encryption keys;
    appending each of the plurality of encryption keys to include a key identifier tag, thus defining a plurality of tagged encryption keys, wherein the key identifier tag included within each tagged encryption key identifies the storage object with which the tagged encryption key is associated, wherein each of the storage objects are associated with one or more of a disk sector, disk platter, disk track, and disk cluster;
    generating a key table for one or more input/output modules (I/O modules), each of the one or more I/O modules coupled to a plurality of disk drives associated with the data storage system;
    receiving data to be stored within the data storage system;
    identifying a destination storage object for storing the received data, wherein the destination storage object is chosen from the plurality of storage objects;
    obtaining the tagged encryption key associated with one of the plurality of the destination storage objects from the key table;
    confirming that the key identifier tag included within the obtained tagged encryption key identifies the destination storage object;
    encrypting the received data using the obtained tagged encryption key; and
    storing the received data within the destination storage object.

2. The method of claim 1 further comprising:
    encrypting each of the tagged encryption keys to define a plurality of encrypted tagged encryption keys.

3. The method of claim 1 further comprising:
    receiving a request for data previously stored within the data storage system;
    identifying a source storage object in which the requested data is stored, wherein the source storage object is chosen from the plurality of storage objects; and
    obtaining the tagged encryption key associated with the source storage object.

4. The method of claim 3 further comprising:
    obtaining the requested data from the source storage object;
    confirming that the key identifier tag included within the obtained tagged encryption key identifies the source storage object; and
    decrypting the requested data using the obtained tagged encryption key.

5. The method of claim 1 wherein at least one of the storage objects defines a portion of a hard disk drive.

6. A computer program product residing on a non-transitory computer readable medium having a plurality of instructions stored thereon which, when executed by a processor, cause the processor to perform operations comprising:
- associating an encryption key with each of a plurality of storage objects within a data storage system, thus defining a plurality of encryption keys;
- appending each of the plurality of encryption keys to include a key identifier tag, thus defining a plurality of tagged encryption keys, wherein the key identifier tag included within each tagged encryption key identifies the storage object with which the tagged encryption key is associated, wherein each of the storage objects are associated with one or more of a disk sector, disk platter, disk track, and disk cluster;
- generating a key table for one or more input/output modules (I/O modules), each of the one or more I/O modules coupled to a plurality of disk drives associated with the data storage system;
- receiving data to be stored within the data storage system;
- identifying a destination storage object for storing the received data, wherein the destination storage object is chosen from the plurality of storage objects;
- obtaining the tagged encryption key associated with one of the plurality of the destination storage objects from the key table;
- confirming that the key identifier tag included within the obtained tagged encryption key identifies the destination storage object;
- encrypting the received data using the obtained tagged encryption key; and
- storing the received data within the destination storage object.

7. The computer program product of claim 6 further comprising instructions for:
- encrypting each of the tagged encryption keys to define a plurality of encrypted tagged encryption keys.

8. The computer program product of claim 6 further comprising instructions for:
- receiving a request for data previously stored within the data storage system;
- identifying a source storage object in which the requested data is stored, wherein the source storage object is chosen from the plurality of storage objects; and
- obtaining the tagged encryption key associated with the source storage object.

9. The computer program product of claim 8 further comprising instructions for:
- obtaining the requested data from the source storage object;
- confirming that the key identifier tag included within the obtained tagged encryption key identifies the source storage object; and
- decrypting the requested data using the obtained tagged encryption key.

10. The computer program product of claim 6 wherein at least one of the storage objects defines a portion of a hard disk drive.

11. A data storage system configured to perform operations comprising:
- associating an encryption key with each of a plurality of storage objects within a data storage system, thus defining a plurality of encryption keys;
- appending each of the plurality of encryption keys to include a key identifier tag, thus defining a plurality of tagged encryption keys, wherein the key identifier tag included within each tagged encryption key identifies the storage object with which the tagged encryption key is associated, wherein each of the storage objects are associated with one or more of a disk sector, disk platter, disk track, and disk cluster;
- generating a key table for one or more input/output modules (I/O modules), each of the one or more I/O modules coupled to a plurality of disk drives associated with the data storage system;
- receiving data to be stored within the data storage system;
- identifying a destination storage object for storing the received data, wherein the destination storage object is chosen from the plurality of storage objects;
- obtaining the tagged encryption key associated with one of the plurality of the destination storage objects from the key table;
- confirming that the key identifier tag included within the obtained tagged encryption key identifies the destination storage object;
- encrypting the received data using the obtained tagged encryption key; and
- storing the received data within the destination storage object.

12. The data storage system of claim 11, wherein the data storage system is further configured to perform operations comprising:
- encrypting each of the tagged encryption keys to define a plurality of encrypted tagged encryption keys.

13. The data storage system of claim 11, wherein the data storage system is further configured to perform operations comprising:
- receiving a request for data previously stored within the data storage system;
- identifying a source storage object in which the requested data is stored, wherein the source storage object is chosen from the plurality of storage objects; and
- obtaining the tagged encryption key associated with the source storage object.

14. The data storage system of claim 13, wherein the data storage system is further configured to perform operations comprising:
- obtaining the requested data from the source storage object;
- confirming that the key identifier tag included within the obtained tagged encryption key identifies the source storage object; and
- decrypting the requested data using the obtained tagged encryption key.

* * * * *